(12) United States Patent
Anderson et al.

(10) Patent No.: US 6,293,364 B1
(45) Date of Patent: *Sep. 25, 2001

(54) LOWER FRAME ASSEMBLY

(75) Inventors: Robert S. Anderson, Garner; Mirza Q. Baig, Sanford; Jeffrey A. Deneve, Sanford; Brian R. Dershem, Sanford; Hasan Kabir, Sanford; Rodney D. McLamb, Cary, all of NC (US); Huan T. Nguyen, Dallas, TX (US); Kevin E. Pielmeier, Apex, NC (US); James H. Siwicke, Monterrey (MX)

(73) Assignee: Caterpillar S.A.R.L., Geneva (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,767

(22) Filed: Jun. 5, 1998

(51) Int. Cl.⁷ .................................................. B62D 21/00
(52) U.S. Cl. ........................... 180/312; 280/785; 296/204
(58) Field of Search ............................... 180/89.1, 89.12, 180/311, 312, 299; 280/781, 785, 797, 800; 296/196, 203.01, 190.08, 190.01, 204; 414/697

(56) References Cited

U.S. PATENT DOCUMENTS

| | | | |
|---|---|---|---|
| T966,007 | * 1/1978 | Liehr et al. | 296/28 R |
| 3,828,952 | 8/1974 | Klee | 214/140 |
| 3,842,927 | 10/1974 | Tantlinger | 180/11 |
| 3,850,473 | 11/1974 | Huber | 296/28 R |
| 3,870,172 | 3/1975 | Huber | 214/140 |
| 3,895,728 | 7/1975 | Heggen | 214/140 |
| 3,963,131 | * 6/1976 | Dimmer | 414/697 |
| 3,984,141 | * 10/1976 | Gilette et al. | 296/203.01 |
| 4,055,262 | 10/1977 | Bauer et al. | 214/140 |
| 4,060,261 | 11/1977 | Bauer et al. | 280/756 |
| 4,074,782 | 2/1978 | Bauer | 180/6.48 |
| 4,131,225 | 12/1978 | Bauer et al. | 228/161 |
| 4,342,470 | * 8/1982 | Matsuda | 280/785 |
| 4,374,600 | 2/1983 | van Zelm | 294/19 R |
| 4,405,280 | 9/1983 | Cochran et al. | 414/685 |
| 4,449,606 | 5/1984 | Buschbom et al. | 180/297 |
| 4,514,007 | 4/1985 | Macht | 296/183 |
| 4,535,868 | 8/1985 | Mather et al. | 180/297 |
| 4,955,455 | 9/1990 | Albright et al. | 180/291 |
| 4,962,825 | 10/1990 | Albright et al. | 180/292 |

FOREIGN PATENT DOCUMENTS

| | | | |
|---|---|---|---|
| 2241686 | 9/1991 | (GB) | E02F/3/30 |
| 2278826 | 12/1994 | (GB) | E02F/3/34 |
| 2291384 | 1/1996 | (GB) | E02F/3/28 |

* cited by examiner

*Primary Examiner*—J. J. Swann
*Assistant Examiner*—David R. Dunn
(74) *Attorney, Agent, or Firm*—Diana L. Charlton

(57) ABSTRACT

A lower frame assembly for use in a skid steer loader machine has front and rear end portions. A front wall is positioned at the front end portion of the lower frame assembly and is connected between a pair of side rails. Each of a pair of spaced transmissions housings with front and rear end portions is connected at the front end portion to the front wall and extends rearwardly along a respective side rail. A fuel tank is connected at the rear end portion of the transmission housings and extends between the side rails so that the fuel tank is integral with the lower frame assembly.

16 Claims, 16 Drawing Sheets

Fig_6

Fig_11

Fig_12

Fig_13_

LOWER FRAME ASSEMBLY

TECHNICAL FIELD

This invention relates generally to a frame assembly for a skid steel loader machine and more particularly to a lower frame assembly utilized therein.

BACKGROUND ART

Skid steer loader machines are manufactured to provide a compact work machine which is maneuverable and durable in various applications. Some skid steer loader machine frames are designed to isolate the forces incurred during operation. Other skid steer loader machine frames are designed to facilitate efficient assembly of various components. There is always a continuing need for improved methods of manufacturing and assembling skid steer loader machines due to high demand and competitive forces. Such improvements should include decreased manufacturing and assembly time and costs coupled with increased durability of the skid steer loader machines.

Some skid steer loader machines use a loader body or lower frame assembly in conjunction with a subframe or upper frame assembly to define a main frame assembly for the machine. The upper frame assembly has an upright fabrication and is mounted to the lower frame assembly so that the upright fabrication partially encloses the engine.

As seen in designs disclosed in U.S. Pat. No. 3,895,728 issued to John P. Heggen on Jul. 22, 1975 and U.S. Pat. No. 4,955,455 issued to Larry E. Albright et al. on Sep. 11, 1990, the lower frame assembly is manufactured to mount the upper frame assembly at a pair of side rails which do not extend fully along the length of the lower frame assembly. The shorter length of the side rails produces a connection between the upper and lower frame assemblies which is non-continuous and promotes unequal distribution of loading on the main frame assembly, decreasing durability of the machine. Further, the lower frame assembly does not incorporate typical subassembly components as structural elements of the lower frame assembly to increase the effective use of space and reduction of assembly time.

The present invention is directed to overcoming the problems as set forth above.

DISCLOSURE OF THE INVENTION

In an aspect of the present invention, a lower frame assembly with front and rear end portions is disclosed which is used in a skid steer loader machine. The skid steer loader machine has a centerline which extends along its midsection. A pair of spaced side rails are positioned on opposite sides of the machine centerline. A front wall is positioned at the front end portion of the lower frame assembly and extends between the side rails for connection therewith. A pair of spaced transmission housings has front and rear end portions. Each of the front end portions of the transmission housings are connected to the front wall and extend rearwardly therefrom a predetermined distance for connection along a respective side rail. A fuel tank has top and bottom plates and a pair of opposed side plates. One of the pair of side plates is connected at the rear end portions of each of the pair of transmission housings so that the fuel tank extends between the side rails.

The present invention incorporates a fuel tank as a structural element of a lower frame assembly for a skid steer loader machine. The utilization of the fuel tank as a structural element of the lower frame assembly increases the effective use of space while reducing assembly time by not employing a separate fuel tank.

BEST MODE FOR CARRYING OUT THE INVENTION

Figure 1:
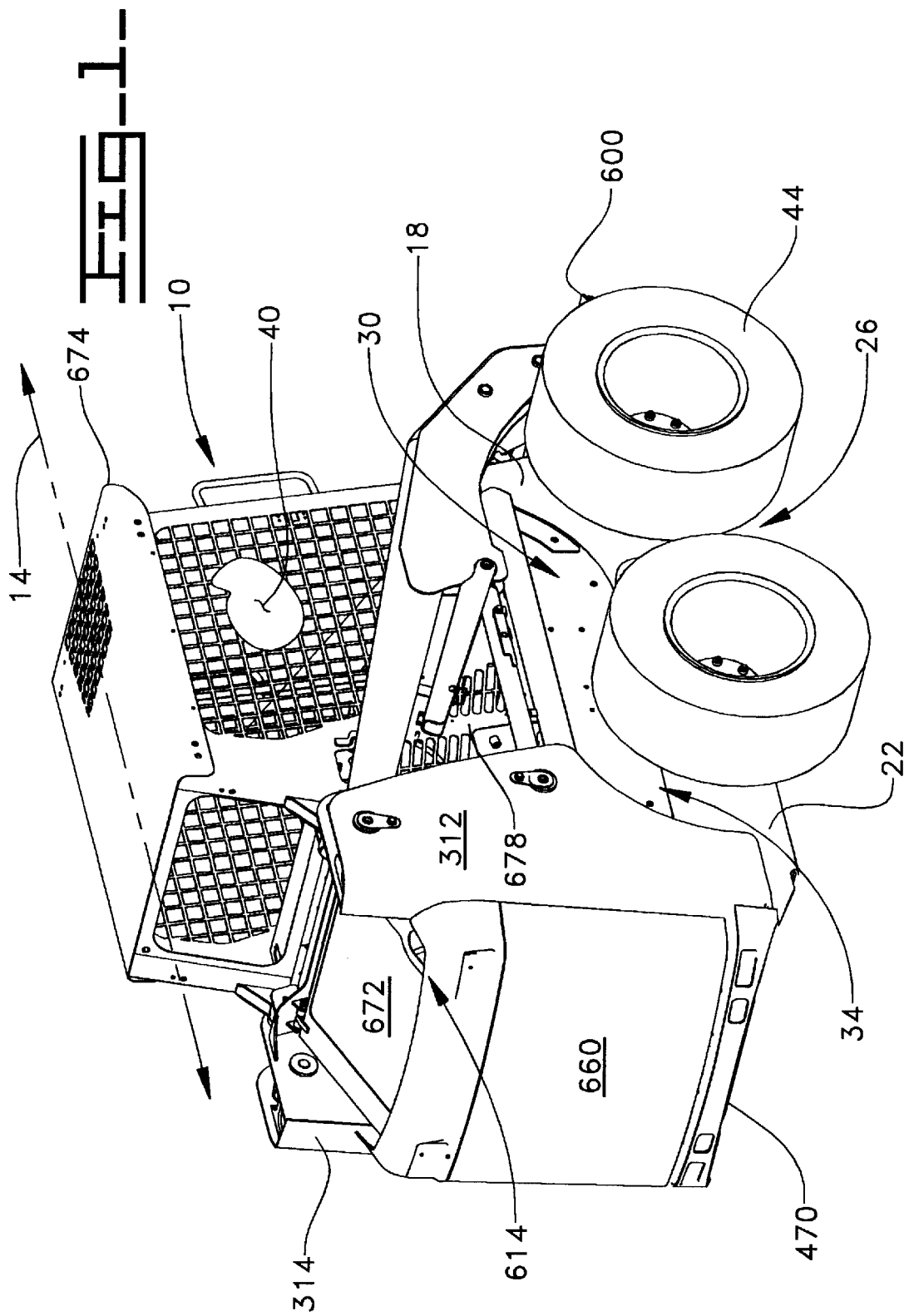
FIG. 1 is a perspective view illustrating one side of a skid steer loader machine in accordance with the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIG. 1, there is shown a work machine 10, commonly known as a skid steer loader, which incorporates the features of the present invention therein. As shown, the loader machine 10 has a general centerline 14 running substantially along the midsection thereof and front and rear end portions 18,22. The loader machine 10 includes a lower frame assembly 26 and an upper frame assembly 30 which are mounted together to define a main frame assembly 34. The loader machine 10 is controlled by an operator (not shown) from within an operator's compartment 40. Through a joystick device (not shown), the operator (not shown) controls the loader machine 10 in a specific manner to achieve independent movement of a pair of wheels 44 located on respective sides of the loader machine 10.

Figure 2:
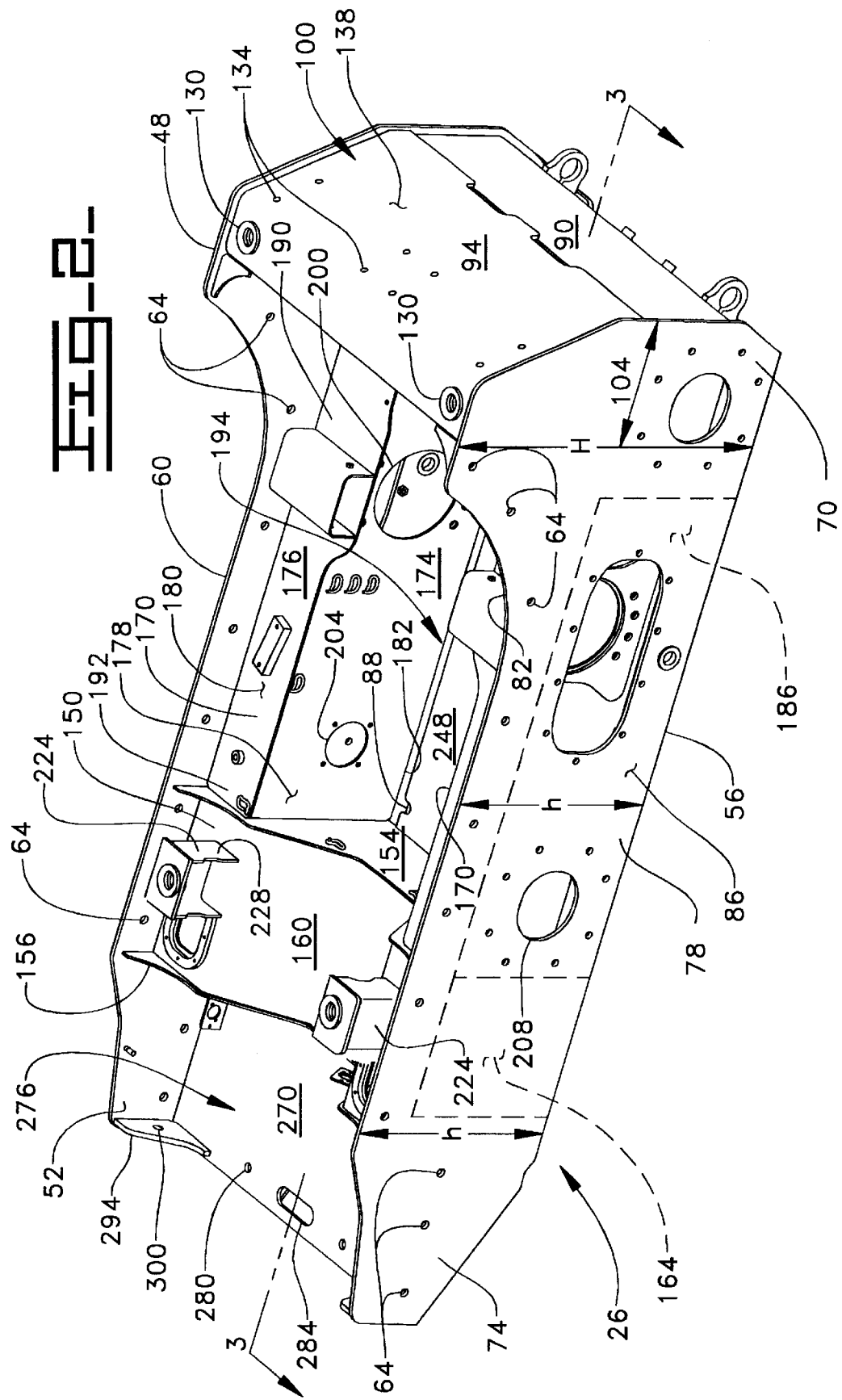
FIG. 2 is a perspective view of a lower frame assembly utilized in the skid steer loader machine shown in FIG. 1.
Figure 3:
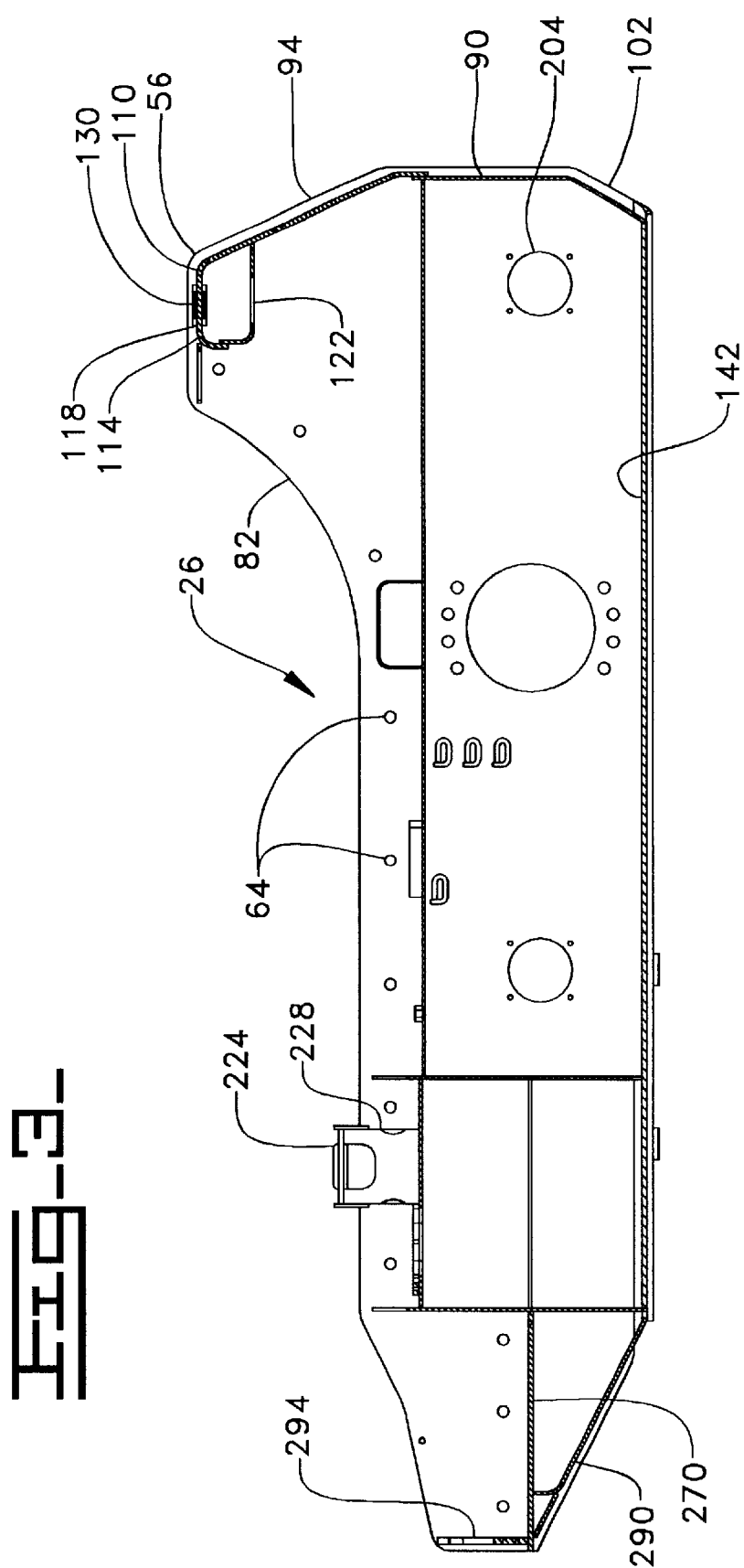
FIG. 3 is a view taken along line 3—3 of the lower frame assembly shown in FIG. 2.

The assembly of the loader machine 10 begins with the manufacture of the lower frame assembly 26, illustrated in FIGS. 2–3, prior to mounting with the upper frame assembly 30. The lower frame assembly 26 has front and rear end portions 48,52. The lower frame assembly 26 includes a pair of spaced, vertically oriented metallic side rails 56,60 which should be manufactured from a high strength steel. The side rails 56,60 extend along the entire length of the lower frame assembly 26 and have a plurality of mounting holes, some of which are shown at 64, defined therealong. The pair of side rails 56,60 each have front and rear end portions 70,74 defined respectively with the front and rear end portions 18,22 of the loader machine 10, and an intermediate portion 78 disposed between the front and rear portions 70,74 of the side rails 56,60. The front end portions 70 of the side rails 56,60 have a height (H) which is greater than the height (h) of the rear end and intermediate portions 74,78. A gradual increase in height of the side rails 56,60 occurs at a section 82 of the intermediate portion 78 which terminates at the front end portion 70. The pair of spaced side rails 56,60 are formed with a substantial ninety degree angle with a smooth bend radius of approximately 20 mm to define side and bottom walls 86,88 of the side rails 56,60. It should be understood that although a specific bend radius is described, any suitable bend radius may be used. A metallic connecting wall 90 extends transversely between the side rails 56,60 and is welded thereto. A substantially angled metallic supporting wall 94 is welded to the connecting wall 90 and side rails 56,60 and extends upwardly therefrom and therebetween, respectively. The connecting wall 90 and supporting wall 94 define a front wall 100 of the loader machine 10. As seen more clearly in FIG. 3, the connecting wall 90 is formed with an angled portion 102 of approximately thirty degrees to provide the front wall 100 with an acute angled surface with respect to the ground (not shown). The mounting holes 64 extend substantially equidistantly along the length of the side rails 56,60 and terminate prior to connection between the side rails 56,60 and the connecting and supporting walls 90,94 to establish a clearance area 104 for the front wall 100, as seen in FIG. 2. The front end portion 70 of the side rails 56,60 are formed to correspond with the angularity of the supporting wall 94. The supporting wall 94 is formed at an upper region 110 to define a substantial inverted u-shape area 114 with a planar upper surface 118, seen more clearly in FIG. 3. An upper reinforcing plate 122 is welded between the angled portion and the inverted u-shape area 114 of the supporting wall 94 to form a crosstube structure between the side rails 56,60. A pair of spaced cab mounts 130 is defined on the upper surface 118 of the supporting wall 94. Access to the cab mounts 130 is defined through the upper reinforcing plate 122 (not visible on the drawings). A plurality of step mount openings 134 extend through a front surface 138 of the supporting wall 94 at the angled portion thereof.

Referring to FIGS. 2 and 3, a horizontally oriented front protective plate 142 is welded to the connecting wall 90 and extends rearwardly between the side rails 56,60. It should be understood that the front protective plate 142 forms the bottom plate or belly of the loader machine 10. The front protective plate 142 is seated on a top surface of the bottom wall 88 and welded to the side rails 56,60. It should be noted that the weld between the front protective plate 142 and the side rails 56,60 may be of any suitable type, such as a lap weld.

A fuel tank 150 is made from metallic material and is assembled integrally with the lower frame assembly 26. A pair of opposed front and rear side plates 154,156 extend transversely between the side rails 56,60 in a spaced relationship from one another and are welded to the bottom wall 88 of the side rails 56,60 and the front protective plate 142 to define therewith a bottom wall (not shown) of the fuel tank 150. A top plate 160 is welded to the side rails 56,60 and pair of front and rear side plates 154,156 in an spaced relationship with the bottom wall (not shown) of the fuel tank 150. The top plate 160 and front and rear side plates 154,156 are connected between the side rails 56,60 so that a portion of the side rails 56,60 form outer walls 164 of the fuel tank 150. The assembled fuel tank 150 establishes a container for fuel storage which is sealed by the welds between the side rails 56,60, protective plate 142, front and rear side plates 154,156, and top plate 160. It should be understood that fuel may be added to or drained from the fuel tank 150 in any suitable manner, such as a respective fill and drain disposed therein.

A pair of spaced transmission housings, one of which is shown at 170, are made from a metallic material and are assembled integrally with the lower frame assembly 26. A pair of elongated metallic plates 174,176 are positioned on opposite sides of the loader machine centerline 14 for extension along a respective side rail 56,60 between the front wall 100 and fuel tank 150. The plate 174 is seated on the bottom wall 88 of the side rails 56,60 at a vertical orientation and spaced relationship therefrom. The plate 176 is seated on the plate 174 at a horizontal orientation therefrom for extension between the plate 174 and side rails 56,60. The plates 174,176 are welded together and with the side rails 56,60 to form respective inner side walls 178 and top walls 180 of the transmission housings 170. A portion of the bottom and side walls 86,88 of the side rails 56,60 defines a respective bottom wall 182 and outer side wall 186 of the transmission housings 170. The transmission housings 170 each have front and rear end portions 190,192 which are welded to the respective connecting wall 90 and front side plate 154 of the fuel tank 150. The connecting wall 90 and front side plate 154 enclose the front and rear end portions 190,192 of the transmission housings 170. The welded relationship between the side rails 56,60, front wall 100, front protective plate 142, fuel tank 150, and transmission housings 170 defines a partially enclosed forward compartment 194 with a box-like structure between the pair of transmission housings 170. It should be understood that drainage from the forward compartment 194 may be defined within the structure of the lower frame assembly 26 or in any suitable manner. The inner side wall 178 of each of the transmission housings 170 defines a motor opening 200 and pair of axle access openings, one of which is shown at 204. The outer side wall 186 of each of the transmission housings 170 defines a pair of axle opening, one of which is shown at 208, coaxially aligned with the respective axle access openings 204 on the inner side walls 178.

A pair of spaced engine mounting structures, one of which is shown at 224, are connected to the top plate 160 of the fuel tank 150. Each one of the pair of engine mounting structures 224 defines a mounting hole 226 therethrough. Each one of the pair of engine mounting structures 224 and respective mounting holes 226 are positioned in a spatial relationship with a respective one of the pair of side rails 56,60. The engine mounting structures 224 include an elongated tower portion 228 enclosed at a top surface by a roof portion 236 defining the opening 226 therethrough. The roof portion 236 of each of the engine mounting structures 224 has a spatial relationship with the top plate 160 of the fuel tank 150. The top plate 160 of the fuel tank 150 is formed to define a depressed area 244 disposed between the pair of engine mounting structures 224.

A horizontally oriented rear protective plate 270 is connected to the side wall 156 of the fuel tank 150 and extends rearwardly therefrom a predetermined distance. The rear protective plate 270 is positioned between the side rails 56,60 for connection therewith to define a rearward compartment 276 which has a slightly higher elevation from the ground (not shown) than the forward compartment 194. The rear protective plate 270 includes a pair of spaced lower bumper mounting holes, one of which is shown at 280, extending therethrough. A bolt access hole 284 is defined through the rear protective plate 270 and positioned between the pair of lower bumper mounting holes 280. An angled reinforcing plate 290 is connected to the front protective plate 142 in a location rearward from the fuel tank 150 for support of the rear protective plate 270 at the rear end portion 52 of the lower frame assembly 26. A pair of opposed back flanges 294 are positioned at the rear end portion 52 of the lower frame assembly 26. Each back flange 294 is positioned and connected at one end of a respective side rail 56,60 opposite the front wall 100. The back flanges 294 extend laterally from the side rails 56,60 a predetermined distance for connection along the rear protective plate 270. Each of the back flanges 294 has an upper bumper mounting hole therethrough, one of which is shown at 300.

Figure 4:
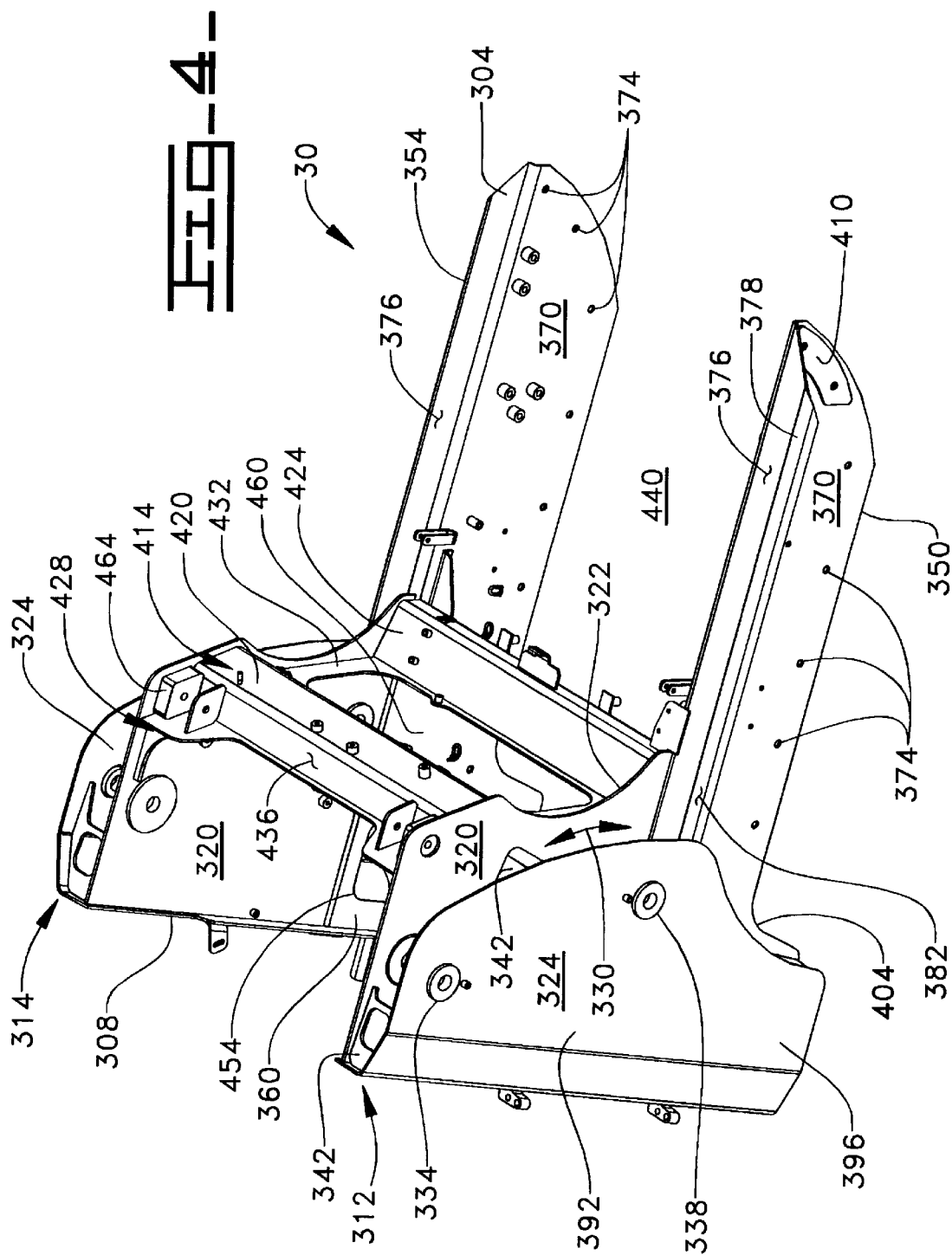
FIG. 4 is a perspective view of an upper frame assembly utilized in the skid steer loader machine shown in FIG. 1.
Figure 5:
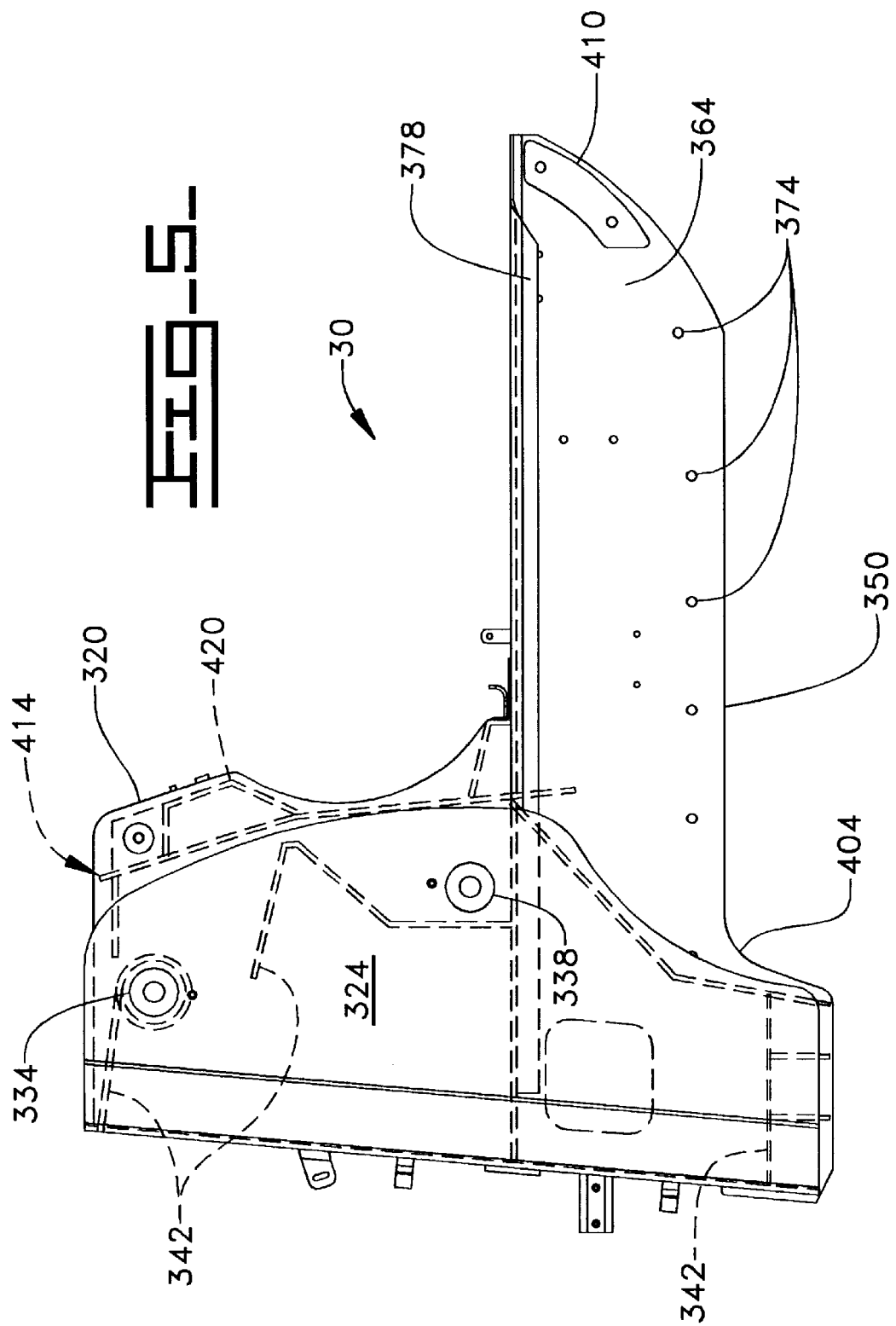
FIG. 5 is a side view of the upper frame assembly shown in FIG. 4, including internal structure thereof.
Figure 6:
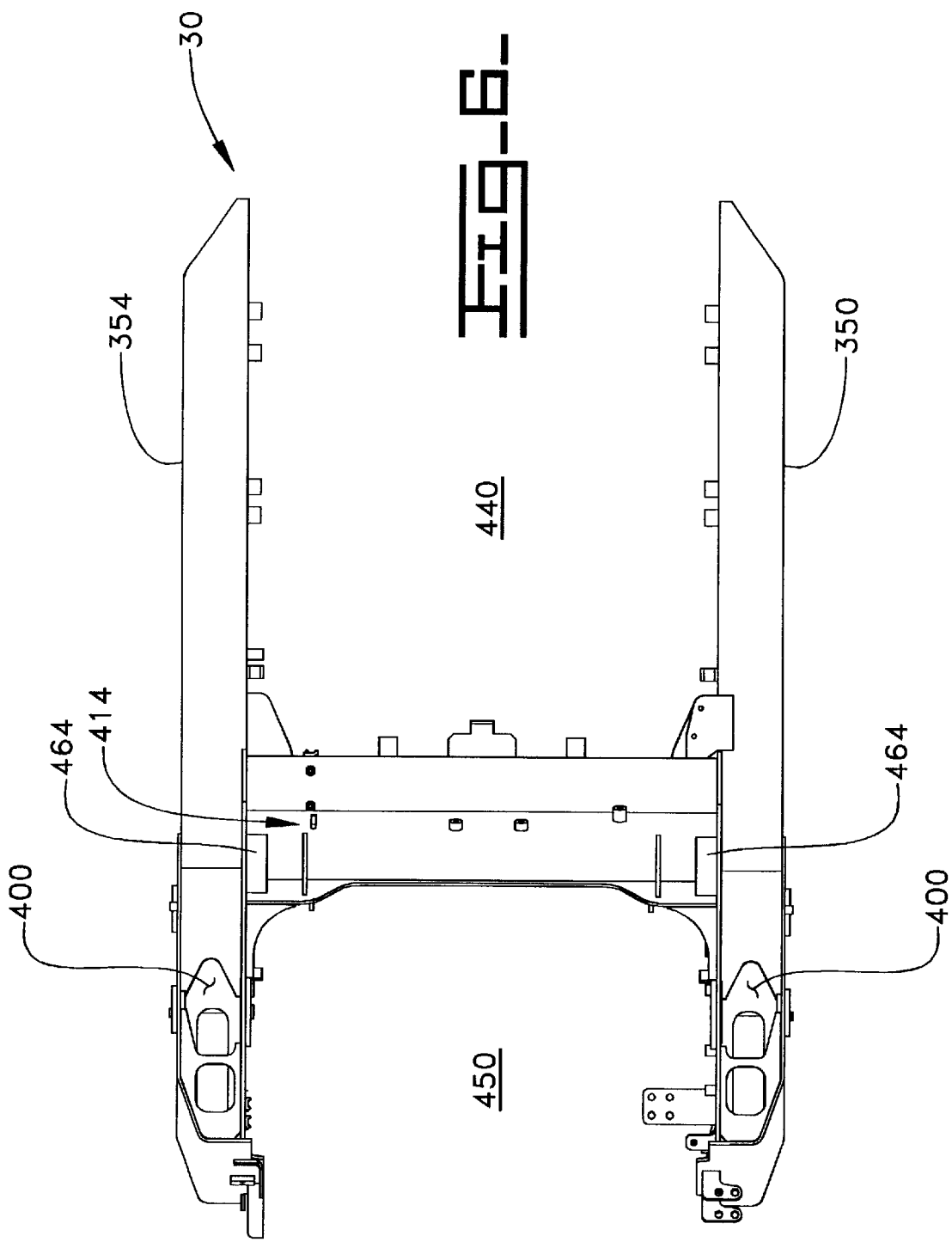
FIG. 6 is a top view of the upper frame assembly shown in FIG. 4, including open access and service areas.

Additionally, the upper frame assembly 30 is manufactured prior to mounting on the lower frame assembly 26, as is shown in FIGS. 4–6, and has front and rear end portions 304,308. The manufacture of the upper frame assembly 30 may be simultaneous with the manufacture of the lower frame assembly 26 for obvious efficiency considerations. A pair of spaced tower assemblies 312,314 are positioned on opposite sides of the loader machine centerline 14. Each of the pair of tower assemblies 312,314 include metallic inner and outer plates 320,324. The outer plates 324 are formed for welded connection with the inner plates 320 to define a spatial region 330 therebetween. The inner plates 320 each have a contoured air flow area 332 defined therein. The inner and outer plates 320,324 each have a predetermined height and width. Each of the pair of tower assemblies 312,314 define upper and middle pinjoint openings 334,338 which extend through the inner and outer plates 320,324. Each of the pair of tower assemblies 312,314 are rigidly supported by a plurality of metallic strengthening members, some of which are shown at 342, welded between the inner and outer plates 320,324, seen more clearly in FIG. 5. A pair of metallic side members 350,354 extend along the entire length of the upper frame assembly 30 and have a shorter length than the length of the side rails 56,60 of the lower frame assembly 26. Each one of the pair of side members 350,354 are welded to a respective tower assembly 312,314 by disposing a rear end portion 360 of the side members 350,354 within a portion of the spatial regions 330 to define a pair of side assemblies. A front end portion 364 of the side members 350,354 extends longitudinally from each of the pair of tower assemblies 312,314. Each of the pair of side members 350,354 are formed to define a side wall 370 with a plurality of mounting holes, some of which are shown at 374, which extend substantially equidistantly along the length of the upper frame assembly 30. An upper wall 376 of the side members 350,354 is substantially perpendicular with the side wall 370 and includes a bent flange 378 which extends substantially along the length of the upper frame assembly 30. The bent flange 378 has a mounting surface 382 substantially parallel with the side wall 370 and spaced therefrom. Each of the inner plates 320 of the pair of tower assemblies 312,314 is welded to the upper wall 376 of the respective side member 350,354 along a portion of the length thereof. Each of the outer plates 324 of the pair of tower assemblies 312,314 has a middle portion 392 which is welded to the bent flange 378 at the mounting surface 382 of the respective side member 350,354 along a portion of the length thereof. A lower portion 396 of the outer plates 324 is welded to the side wall 370 through one of the plurality of strengthening members 342 connected therebetween to define a fender compartment 400, seen more clearly in FIG. 6. The outer plates 324 of the pair of tower assemblies 312,314 have a contoured shape which corresponds to a contoured section 404 of each of the side walls 370 of the side members 350,354 at a location proximate the connection with the side walls 370. The side wall 370 of the side members 350,354 has a height which increases at the contoured section 404 of the side walls 370. A support plate 410 is connected to each of the side walls 370 of the side members 350,354 at the front end portion 364 thereof.

A crossmember assembly 414 is connected between the pair of side assemblies, consisting of the tower assemblies 312,314 and side members 350,354, for exclusive connection therebetween. The crossmember assembly 414 is positioned between the front and rear end portions 364,360 of the side members 350,354 so that the side members 350,354 are independently spaced from one another at the front and rear end portions 364,360 to facilitate connection with the respective side rails 56,60 of the lower frame assembly 26. The crossmember assembly 414 includes upper and lower crossmembers 420,424 which are formed metallic plates with a channel shape. A frame structure 428 is partially defined by the inner plates 320 of the tower assemblies 312,314 and includes a cross plate 432 which extends between the inner plates 320. The upper and lower crossmembers 420,424 are welded to the frame structure 428 along the cross plate 432 for connection between the inner plates 320. The upper crossmember 420 has an upper substantially planar surface 436. The crossmember assembly 414 is positioned to define with the front end portions 364 of the side members 350,354 an open access area 440 at the front end portion 304 of the upper frame assembly 30 between the independent side members 350,354. The open access area 440 is unobstructed by structural elements of the upper frame assembly 30 so that the front end portions 364 of the side members 350,354 have no connection therebetween. The crossmember assembly 414 is positioned to define with the rear end portions 360 of the side members 350,354 and the pair of tower assemblies 312,314 an open service area 450 at the rear end portion 308 of the upper frame assembly 30 which is separated from the open access area 440 by the crossmember assembly 414. The open service area 450 has a height and depth substantially equal to the respective height and width of the outer plates 324 of the tower assemblies 312,314 and is substantially unobstructed by structural elements of the upper frame assembly 30. The open access and service areas 440,450 can be seen more clearly in FIG. 6. An assembly access opening 454 is defined on each of the side walls 370 at the rear end portion 360 of the side members 350,354 and allows access between the open service area 450 and the fender compartment 400. The cross plate 432 defines an open region 460 between the upper and lower crossmembers 420,424 which provides access and air communication between the open access area 440 and open service area 450. A cab mounting structure 464 is connected on each of the inner plates 320 of the tower assemblies 312,314 within the frame structure 428 at a juncture between the upper surface 436 of the upper crossmember 420 and the cross plate 432.

Figure 7:
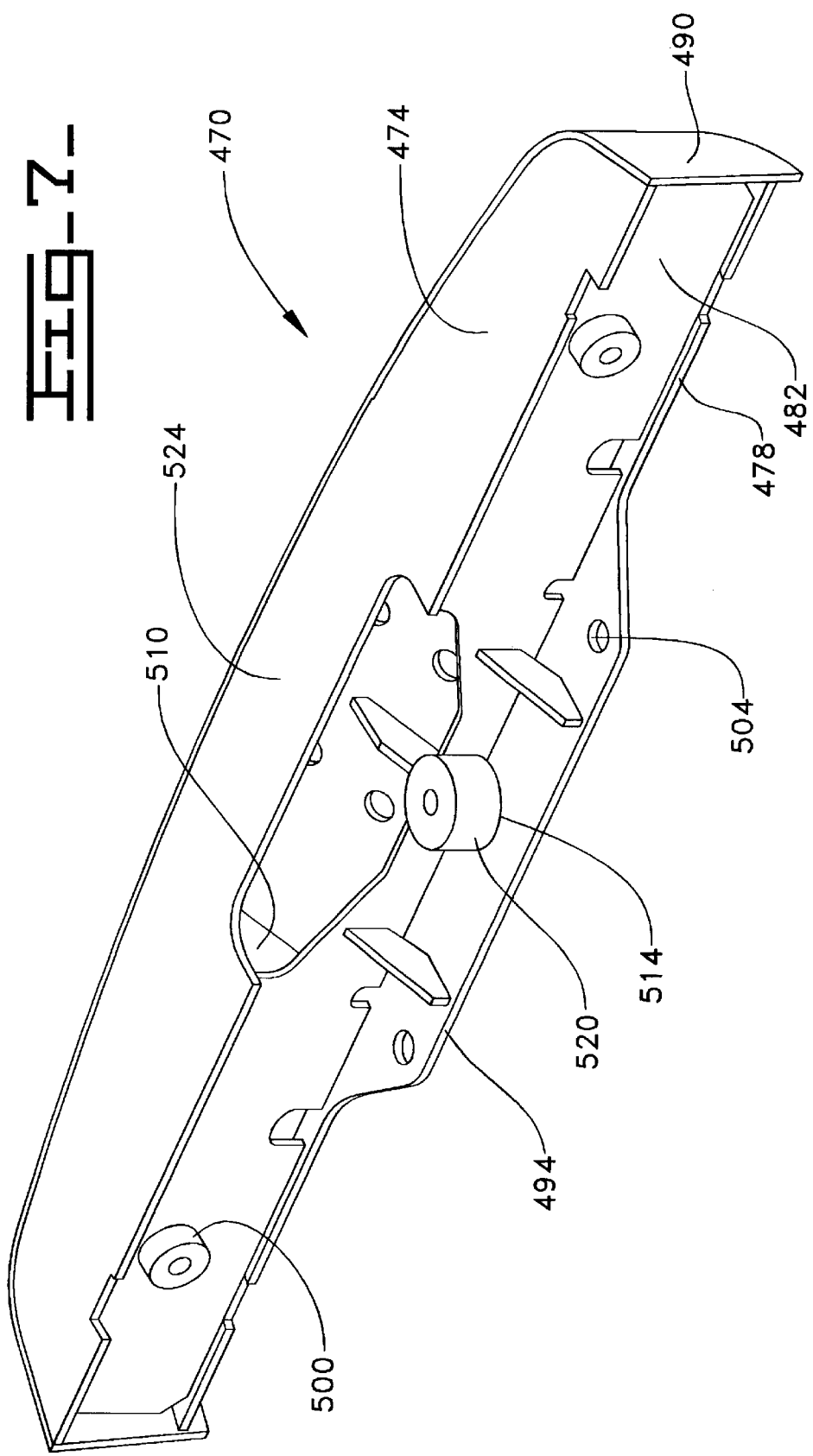
FIG. 7 is a perspective view of a bumper assembly utilized in the skid steer loader machine shown in FIG. 1.

Additionally, a bumper assembly 470 is manufactured, as shown in FIG. 7, which may be simultaneous to the manufacture of the lower and upper frame assemblies 26,30. The bumper assembly 470 includes opposed metallic upper and lower plates 474,478 and opposed metallic inner and outer side plates 482,490. The outer side plate 490 is formed to connect the upper, lower, and inner side plates 474,478,482 to establish a substantial box-like structure. The lower plate 478 has an integral flanged portion 494 which extends forwardly of the inner side plate 482. The inner side plate 482 has a pair of spaced upper bumper mounting openings, one of which is shown at 500. The flanged portion 494 of the lower plate 478 includes a pair of lower bumper mounting openings, one of which is shown at 504. A recessed clearance area 510 is defined within the box-like structure of the bumper assembly 470. An engine stabilizing structure 514 is connected at the flanged portion 494 of the lower plate 478 and is partially disposed within the clearance area 510. The engine stabilizing structure 514 and the engine mounting structures 224 are operatively associated to define an engine mounting and stabilizing arrangement 516 for the loader machine 10. The engine stabilizing structure 514 includes a boss 520 which is welded to the flanged portion 494 at a substantial midpoint 524 of the bumper assembly 470. It should be understood that the engine stabilizing structure 514 does not need to be disposed within the clearance area 510 to accomplish the purpose of the invention.

A method 530 for assembling the loader machine 10 includes manufacturing the lower and upper frame assemblies 26,30 (as described above). Additionally, the lower and upper frame assemblies 26,30 are subassembled with various components prior to their being mounted together.

Figure 8:
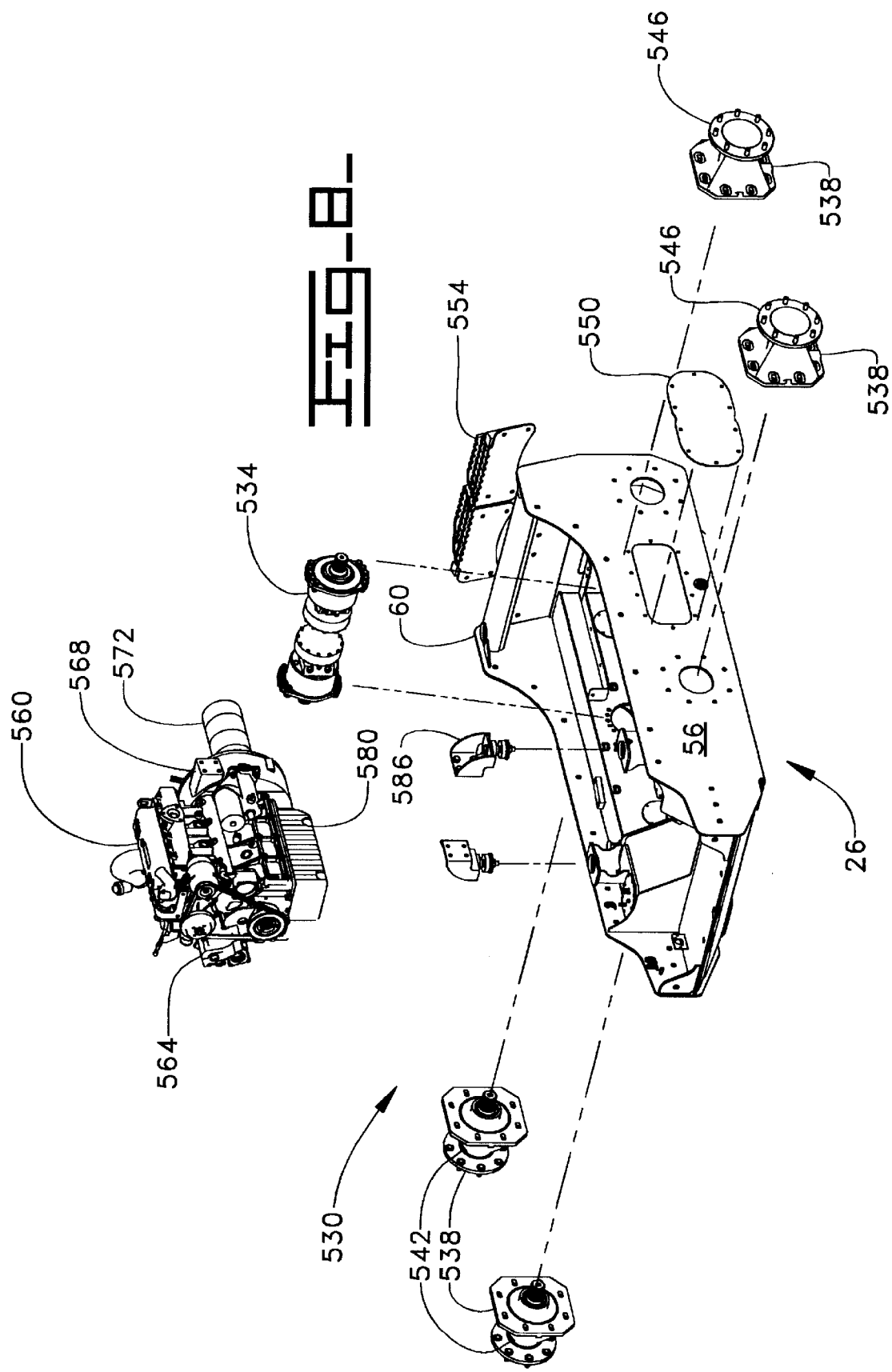
FIG. 8 is an exploded view of the subassembly of the lower frame assembly shown in FIG. 2, including hydraulic motors, axles, steps, and engine with hydraulic pump.
Figure 9:
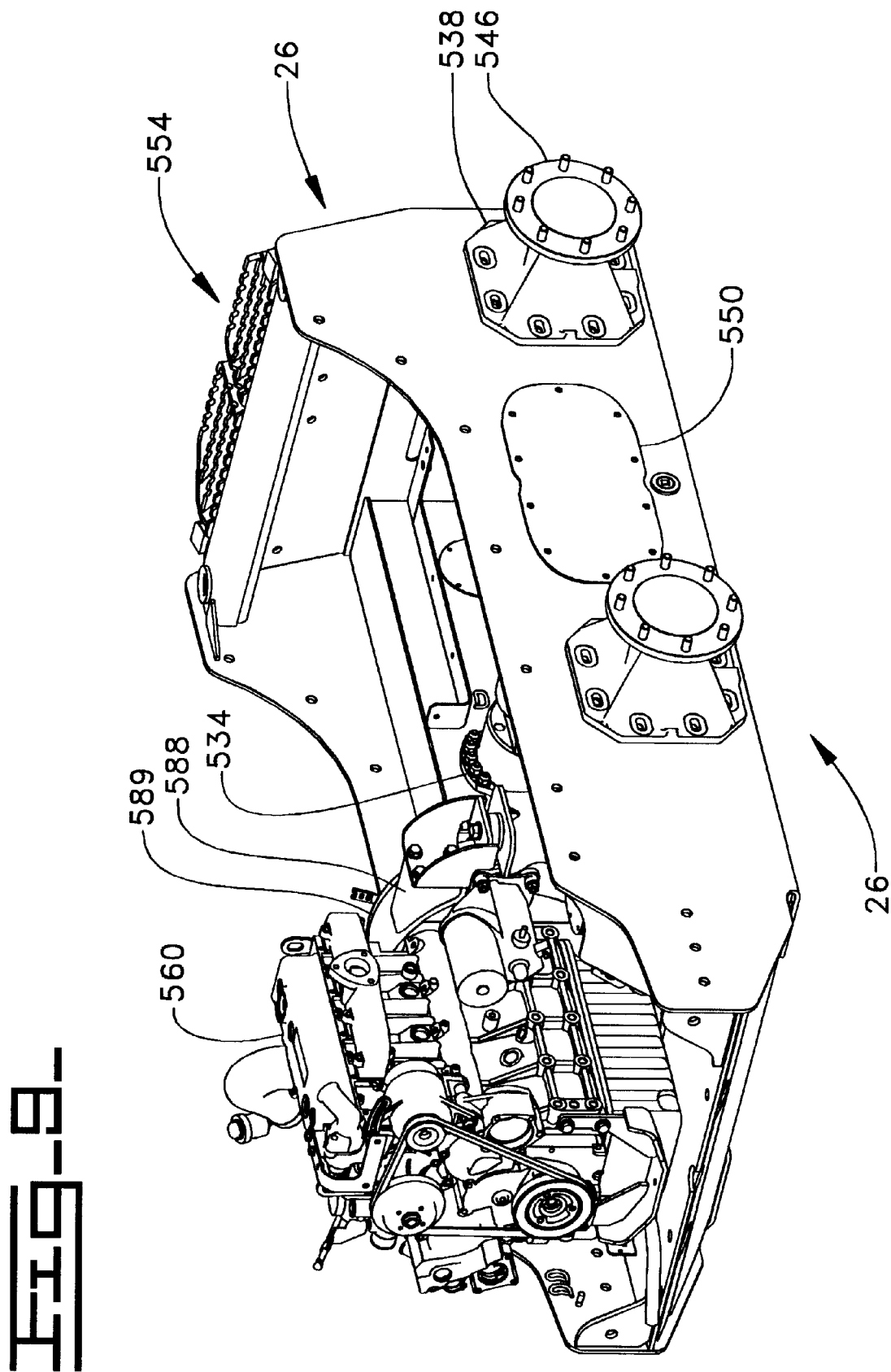
FIG. 9 is a perspective view of the subassembled lower frame assembly including the subassembly components mounted therein.

As can be seen in FIGS. 8–9, the subassembly of the lower frame assembly 26 includes providing a pair of hydraulic motors 534 and a plurality of axles, some of which are shown at 538. The hydraulic motors 534 are mounted on each of the respective inner side walls 178 of the transmission housings 170 for partial extension through the respective motor openings 200. A pair of the plurality of axles 538 are mounted on each of the respective outer side walls 186 of the transmission housings 170. Each of the plurality of axles 538 includes an axle shaft 542 on one end which is rotatably disposed within each of the axle mounting openings 208 and a wheel mount 546 on an end opposite the axle shaft 542. The hydraulic motors 534 are coupled within the respective transmission housing 170 to the axle shafts 542 of the respective pair of axles 538 for driving connection by means of a sprocket and chain linkage (not shown). A cover plate 550 is then secured to each of the side rails 56,60 at the defined outer wall 186 of the transmission housings 170. A pair of step assemblies 554 are mounted at the front wall 100 by a plurality of bolts assemblies (not shown) which extend through the step openings 134 and supporting wall 94. The step assemblies 554 are positioned to facilitate an operator's (not shown) entry into the loader machine 10. It should be understood that at this time, various other subassembly components, such as linkages, pedals, valves, electrical lines, and the like, may also be assembled into the lower frame assembly 26.

Next, an engine 560 with front and rear end portions 564,568 is assembled with a hydraulic pump assembly 572. The hydraulic pump assembly 572 is connected in a cantilevered manner to a flywheel (not shown) at the rear end portion 568 of the engine 560. The engine 560 is mounted in-line within the lower frame assembly 26 and aligned in a parallel relationship with the side rails 56,60. An oil pan 580 of the engine is seated within the depressed region 244 of the fuel tank 150. The rear end portion 568 of the engine 560 is resiliently mounted to the pair of engine mounting structures 224 by a pair of resiliently mounted brackets 586. The mounting brackets 586 are connected to a mounting block 588 extending from a flywheel housing 589 of the engine 560. The resilient mounting may be accomplished in any suitable manner, such as by using a typical bolt and nut assembly in conjunction with a vibration dampening elastomeric material. The mounting brackets 586 may be of any suitable design and include a curved structure 590 which allows for horizontal bolting of the mounting brackets 586 with the engine 560 and vertical bolting of the mounting brackets 586 with the engine mounting structures 224. The rear end portion 568 of the engine 560 at the hydraulic pump assembly 572 extends from the rearward compartment 276 to the forward compartment 252 of the lower frame assembly 26. The hydraulic pump assembly 572 is then fluidly connected by a plurality of hoses (not shown) to each of the hydraulic motors 534. The fuel tank 150 is fluidly connected by a fuel line (not shown) to the engine 560.

Figure 10:
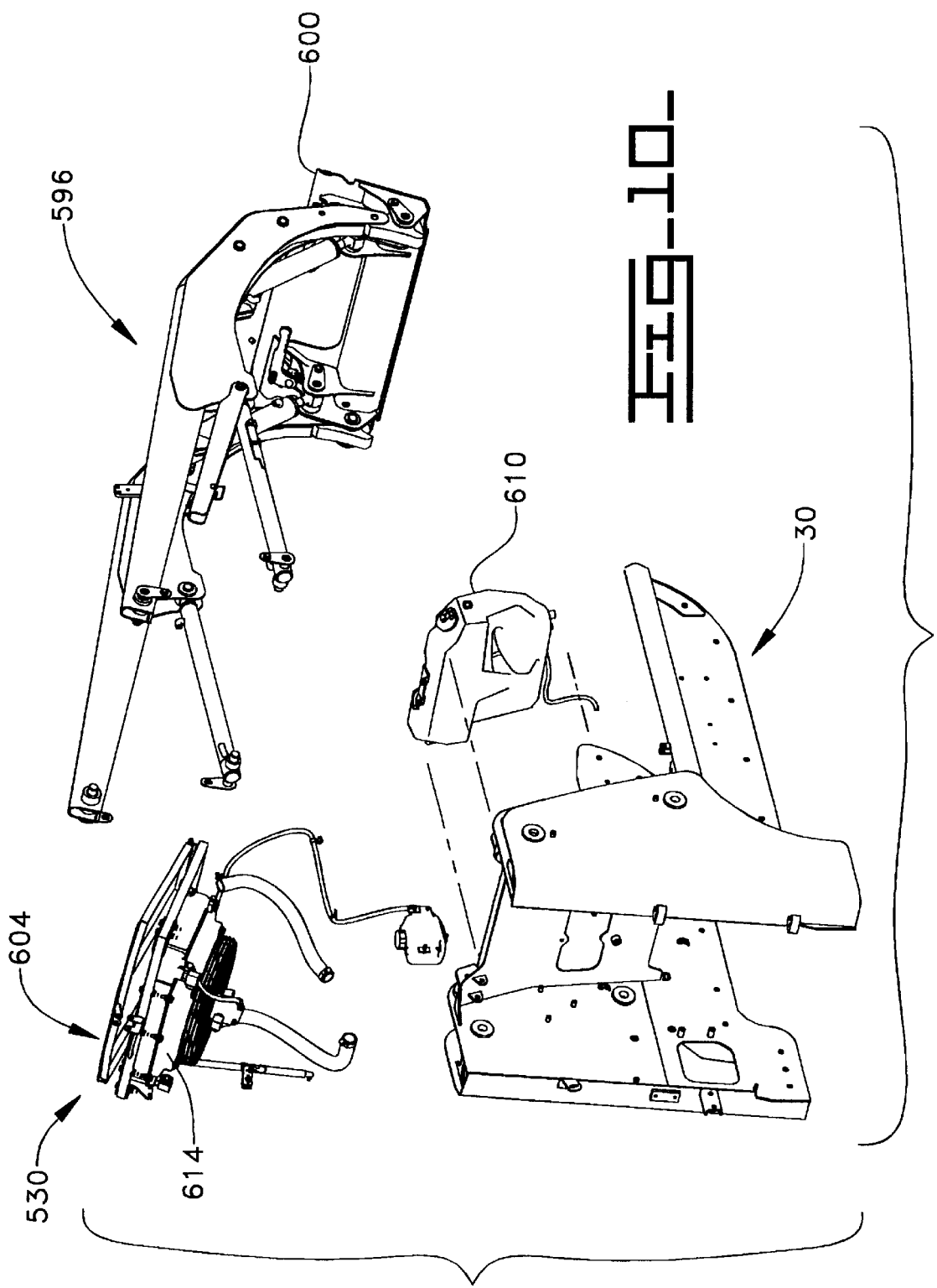
FIG. 10 is an exploded view of the subassembly of the upper frame assembly shown in FIG. 4, including lift arm assembly and cooling system.
Figure 11:
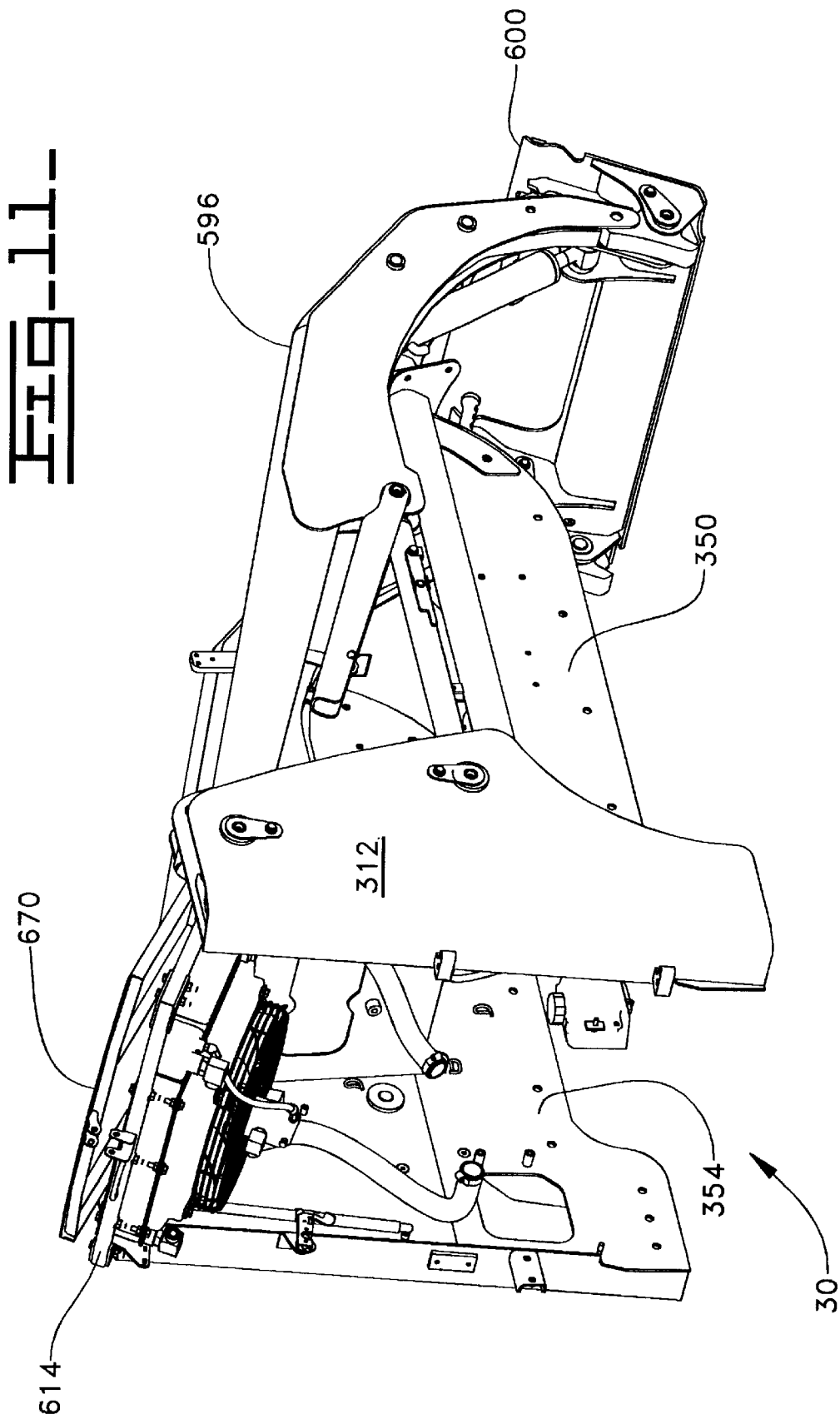
FIG. 11 is a perspective view of the subassembled upper frame assembly including the subassembly components mounted therein.

As can be seen in FIGS. 10–11, the subassembly of the upper frame assembly 30 includes rotatably mounting a lift arm assembly 596 between the inner and outer plates 320,324 of each of the pair of tower assemblies 312,314 at the upper and middle pin joint openings 334,338 in a well-known manner. A coupling mechanism 600 is mounted with the lift arm assembly 596 prior to mounting on the upper frame assembly 30. A cooling system 604 is mounted to the upper frame assembly 30 and includes a hydraulic tank 610 and radiator assembly 614. The hydraulic tank 610 is mounted to the crossmember assembly 414 between the pair of tower assemblies 312,314 adjacent the open access area 440 in a spaced relationship from the open region 460. The radiator assembly 614 is pivotally mounted for movement between operational and service positions, shown at FIGS. 1 and 14, respectively, and located within the open service area 450 between the pair of tower assemblies 312,314. A plurality of hydraulic lines (not shown) are positioned between the inner and outer plates 320,324 of the tower assemblies 312,314 and connected with the lift arm assembly 596 for operation thereof. It should be understood that at this time, various other subassembly components, such as a joystick, valves, and the like, may also be assembled into the upper frame assembly 30.

The upper frame assembly 30 is dropped onto and connected with the lower frame assembly 26 upon completion of the respective subassemblies (as described above).

Figure 12:
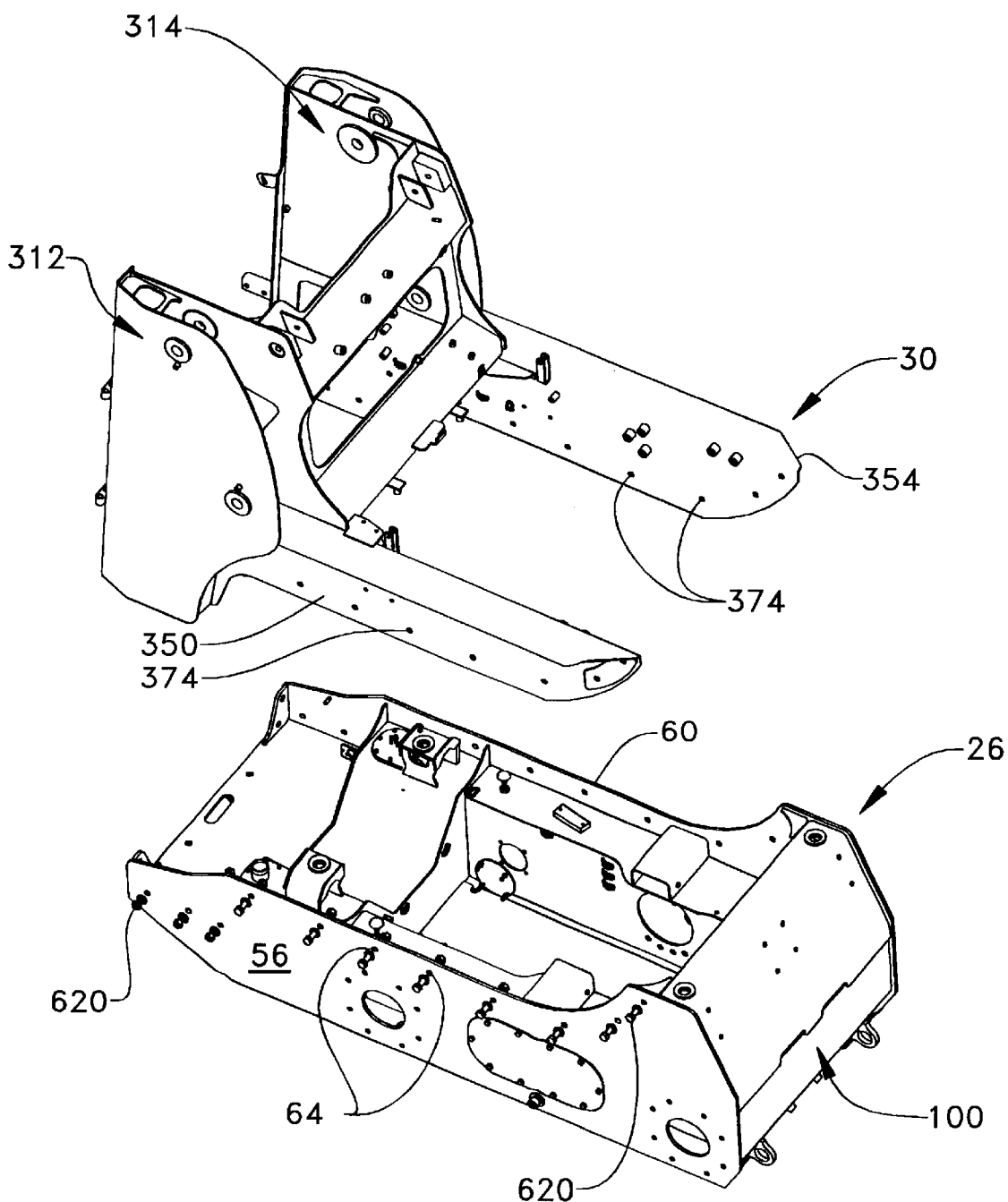
FIG. 12 is an perspective, exploded view of a main frame assembly defined by the upper and lower frame assemblies and shown without subassembly components therein for simplification of viewing.
Figure 13:
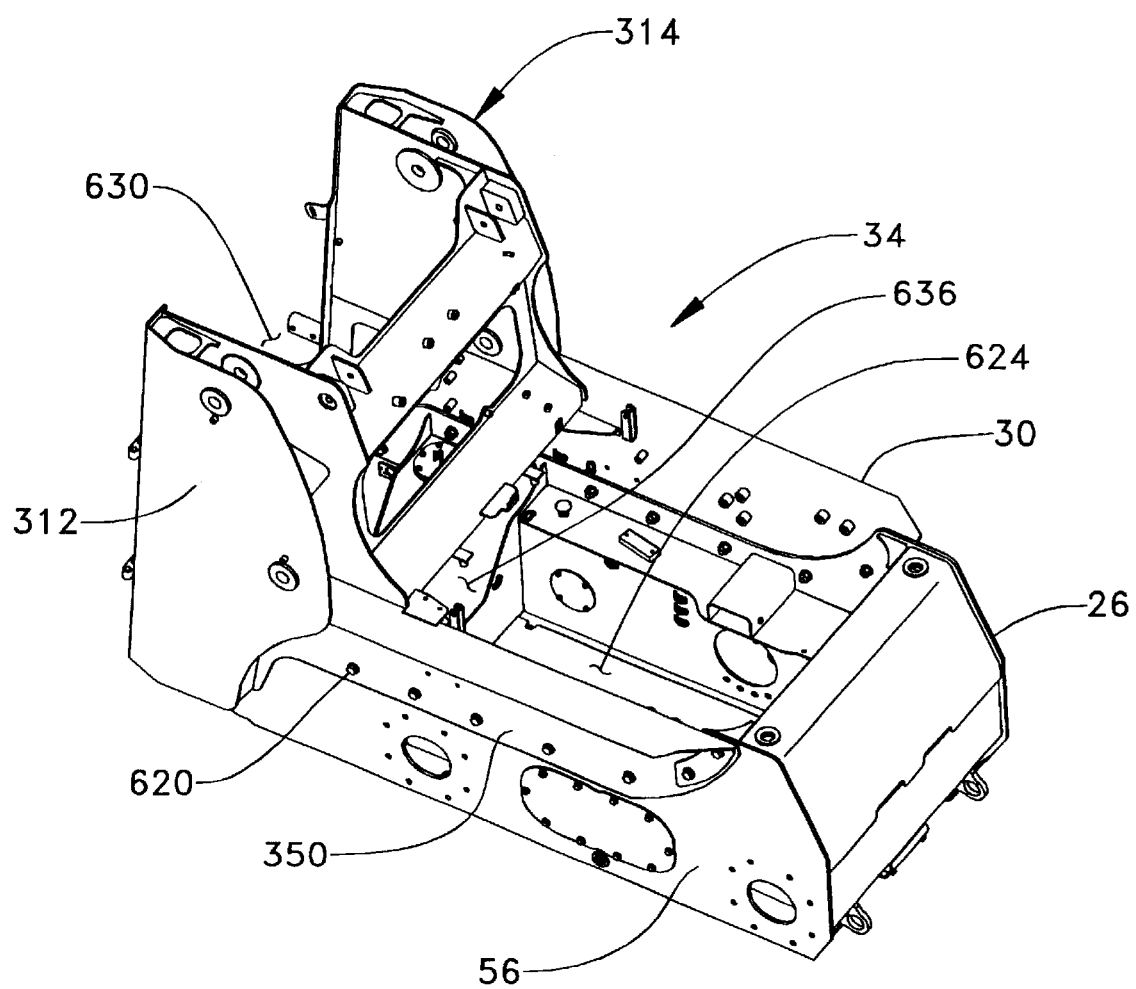
FIG. 13 is a perspective view of the main frame assembly without the subassembly components of the upper and lower frame assemblies for viewing simplification.

The upper frame assembly 30 and the lower frame assembly 26 of the main frame assembly 34 are shown prior to connection in FIG. 12 and shown connected in FIG. 13. The subassembly components of both the upper and lower frame assemblies 30,26 have been removed to more clearly show the connection between the upper and lower frame assemblies 30,26. The upper frame assembly 30 is mounted to the lower frame assembly 26 by a plurality of bolt and nut assemblies, one of which is shown at 620, to define the main frame assembly 34. The bolts extend horizontally through the respective openings 374,64 in the side members 350,354 of the upper frame assembly 30 and the respective side rails 56,60 of the lower frame assembly 26 for tightening with the nuts to define an exclusive horizontal bolted connection therebetween for establishment of the main frame assembly 34. The horizontal bolted connection extends substantially along the entire length of both the upper and lower frame assemblies 30,26 and corresponding length of the loader machine 10 and is the only connection between the lower and upper frame assemblies 26,30. As seen in FIG. 13, a front compartment 624 of the main frame assembly 34 is defined by the forward compartment 194 of the lower frame assembly 26 and the open access area 440 between the side members 350,354 at the front end portion 364 of the upper frame assembly 30. A rear compartment 630 of the main frame assembly 34 is defined by the rearward compartment 276 of the lower frame assembly 26 and the open service area 450 between the side members 350,354 and the tower assemblies 312,314 at the rear end portion 360 of the upper frame assembly 30. The rear compartment 630 is separated from the front compartment 624 by the crossmember assembly 414 therebetween and positioned at a slightly higher elevation from the ground than the front compartment 624. The frame structure 428 of the crossmember assembly 414 defines with the top plate 160 of the fuel tank 150 an open engine region 636 which provides access between the rear compartment 630 and the front compartment 624. The rear end portion 568 of the engine 560 at the hydraulic pump assembly 572 extends from the rear compartment 630 to the front compartment 624 through the open engine region 636. The pair of spaced engine mounting structures 224 connected to the top plate 160 of the fuel tank 150 are positioned within the rear compartment 630. The rear compartment 630 has a substantially unobstructed height and depth substantially equal to the respective height and width of the outer plates 324 of the tower assemblies 312,314. The rear compartment 630 is substantially unobstructed by any structural elements of the lower and upper frame assemblies 26,30 excluding a partial obstruction created by a portion of the fuel tank 150.

Figure 14:
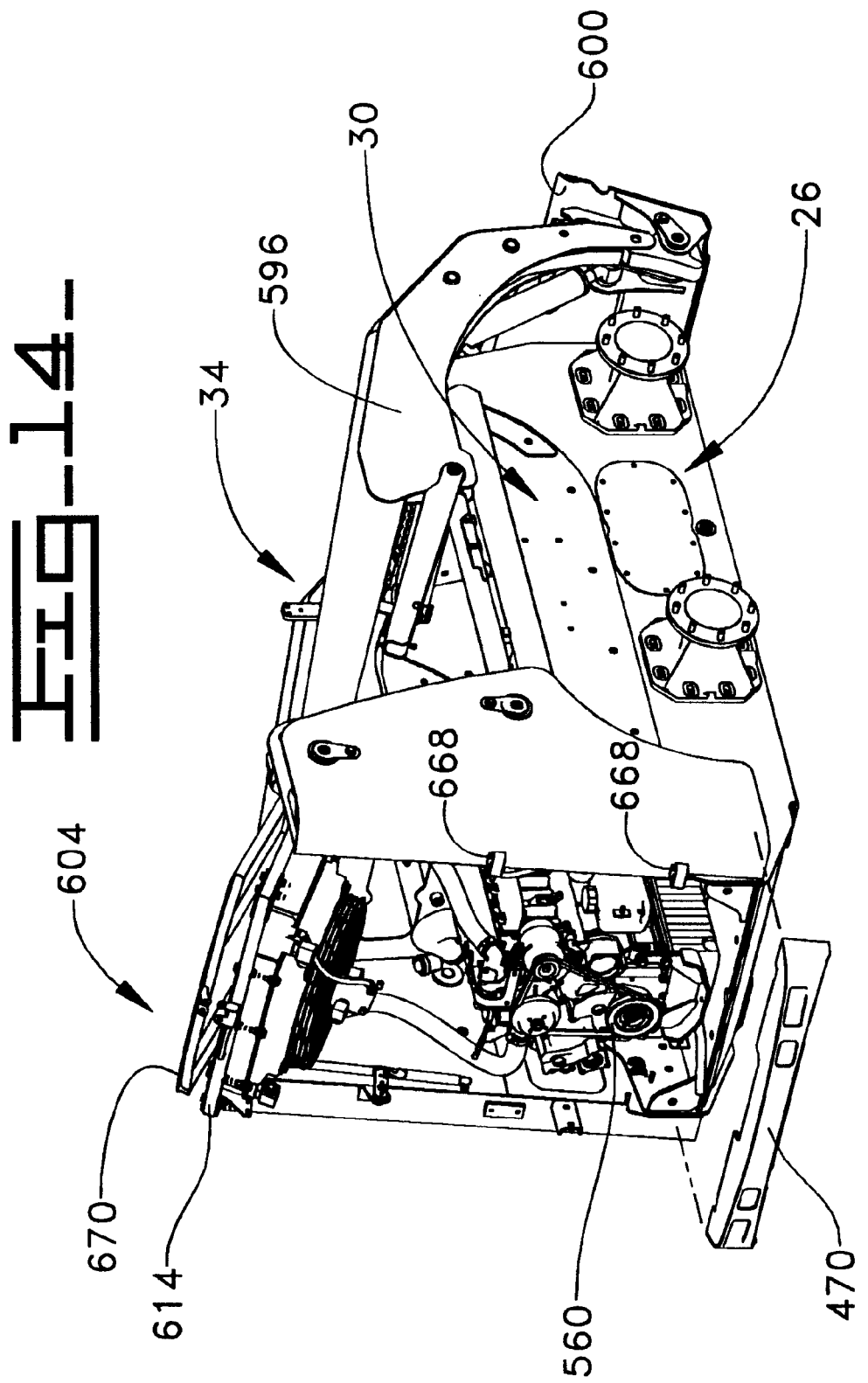
FIG. 14 is a perspective view of the main frame assembly with the subassembly components of the upper and lower frame assemblies and a bumper assembly exploded therefrom.

Once the upper and lower frame assemblies 30,26 are connected with all the subassembly components, as seen in FIG. 14, the cooling system 604 is fluidly connected with the engine 560 and hydraulic pump assembly 572 through a plurality of hydraulic lines (not shown).

Figure 15:
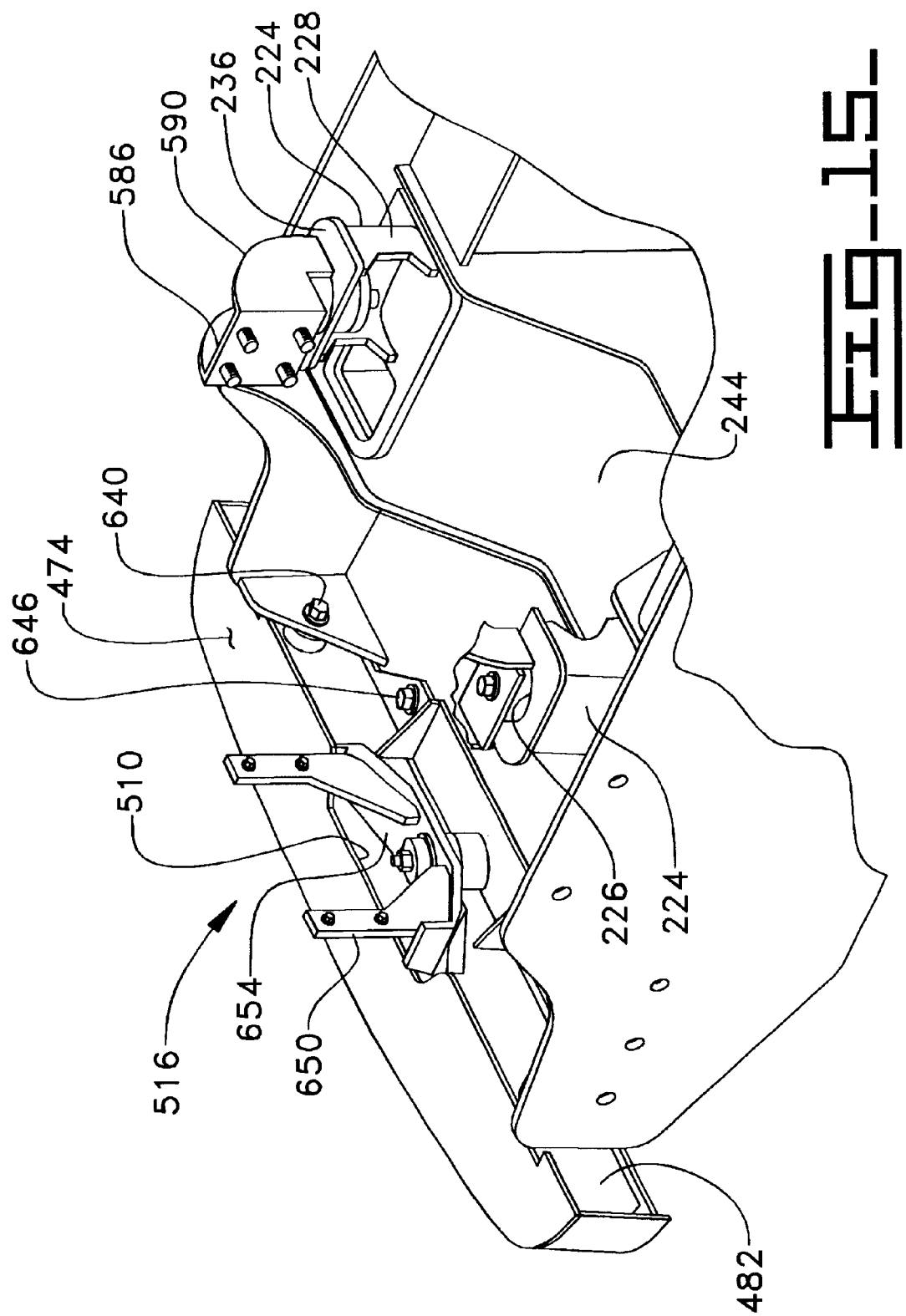
FIG. 15 is a partial, diagrammatic perspective view of the bumper assembly shown in FIG. 7 connected to the lower frame assembly with the upper frame assembly and subassembly components of the lower frame assembly removed for viewing simplification.
Figure 16:
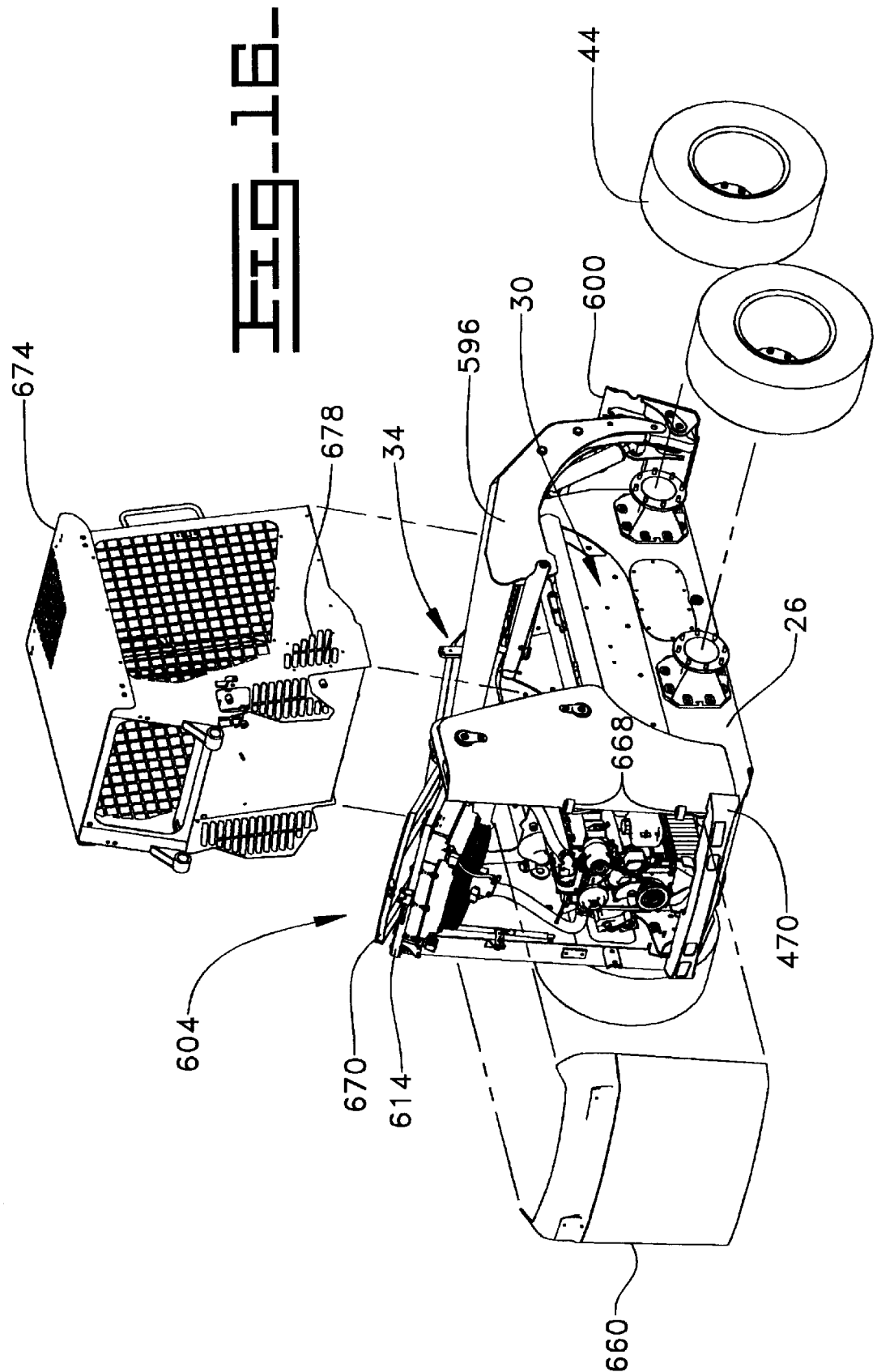
FIG. 16 is a perspective view of the main frame assembly with the bumper assembly attached thereto and a rear door and cab exploded therefrom.

The bumper assembly 470, shown previously in FIG. 7, is mounted to the main frame assembly 34, seen more clearly in FIGS. 15–16. In order to more clearly view the mounting of the bumper assembly 470 to the main frame assembly 34, the upper frame assembly 30 with subassembled components therein and subassembled components of the lower frame assembly 26 have been removed in FIG. 15. The inner side plate 482 of the bumper assembly 470 is connected to the back flanges 294 of the lower frame assembly 26 through a pair of bolts, one of which is shown at 640, which extend through the upper bumper mounting holes 300 and upper bumper mounting openings 500. The lower plate 478 of the bumper assembly 470 is mounted to the rear protective plate 270 of the lower frame assembly 26 through a pair of bolt and nut assemblies, one of which is shown at 646, which extend through the lower bumper mounting holes 280 and lower bumper mounting openings 504 for fastening therebetween. The connection of the bumper assembly 470 to the main frame assembly 34 occurs exclusively at the lower frame assembly 26. The front portion 564 of the engine 560 is resiliently connected to the engine stabilizing structure 514 on the bumper assembly 470 through a resiliently connected stabilizer bracket 650. The resilient connection may be accomplished in any suitable manner, such as by using a typical bolt and nut assembly in conjunction with a vibration dampening elastomeric material. The stabilizer bracket 650 may be of any suitable design and includes a curved structure 654 which allows for horizontal bolting of the stabilizer bracket 650 with the engine 560 and vertical bolting of the stabilizer bracket 650 with the engine stabilizing structure 514 on the bumper assembly 470. The mounting of the bumper assembly 470 to the completed main frame assembly 34, including the upper and lower frame assemblies 30,26 and all respective subassembly components, is seen in FIG. 16.

As seen in FIGS. 1 and 16, a rear access door 660 is connected to the rear end portion 22 of the loader machine 10 adjacent the bumper assembly 470, tower assemblies 312,314, and radiator assembly 614 when the radiator assembly 614 is in the operational position. The rear access door 660 is mounted on a hinge joint 668 for swinging between an open and closed position (not shown). A cover plate 670 is pivotally mounted to the radiator assembly 614 to form a rear hood area 672 of the loader machine 10. A cab assembly 674 is mounted on the front and rear cab mounts 130,464 on the lower and upper frame assemblies 26,30, respectively, for pivotal movement at the rear cab mounts 464 between open and closed positions (not shown). The cab assembly 674 includes a grill area 678 defined adjacent the air flow area 332 on the inner plate 320 when the cab assembly 674 is in the closed position (not shown). The cab assembly 674 includes a roll-over protection as is well-known in loader machines 10. The set of wheels 44 are connected to the wheel mount 546 disposed on the axles 538 in a well-known manner.

The loader machine 10 is filled with fluids in a well-known manner to complete the assembly process and establish a functional loader machine 10.

INDUSTRIAL APPLICABILITY

The fuel tank 150 is integrated with the lower frame assembly 26 as a structural element to partially define the box-like structure of the forward compartment 194 for improved rigidity. The establishment of the fuel tank 150 as a structural element while functioning as a container for fuel effectively utilizes space on the lower frame assembly 26. Additionally, the engine mounting structures 224 are connected to the top plate 160 of the fuel tank 150 which eliminates additional, non-functional structure used for this purpose to further conserve space.

The side rails 56,60 of the lower frame assembly 26 form the outer walls 186,164 of the transmission housings 170 and fuel tank 150 which improves efficiency of the manufacturing process by reducing additional structure and associated costs. By forming the side rails 56,60 with a smooth bend which extends under the transmission housings 170 and fuel tank 150, any welding at the outer surface of the side rails 56,60 is eliminated. The elimination of welds along the outer surface of the side rails 56,60 eliminates welds along the outer sides of the loader machine 10 which increases maneuverability since there are no welds to interfere with performance. Additionally, the smooth bend of the side rails 56,60 allows the front protective plate 142 to be seated on and connected to the bottom wall 88 of the side rails 56,60. The position of the front protective plate 142, therefore, is further from the ground than the bottom wall 88 which increases the height of the belly of the loader machine 10 and further improves performance.

The angled portion of the connecting wall 90 and the angled reinforcing plate 290 at the front and rear end portions 48,52, respectively, of the lower frame assembly 26 enhance the performance of the loader machine 10 during operation by establishing entry and departure angles for ground clearance.

The front end portions 70 of the side rails 56,60 are connected with the front wall 100 so that the clearance area 104 allows for the front mounting of the cab assembly 674 on the lower frame assembly 26. The shorter length of the side members 350,354 of the upper frame assembly 30 ensures that the connection of the front end portions 364 thereof terminate rearward from the front wall 100 of the lower frame assembly 26 and do not extend within the mounting clearance area 104. The increased height of the front end portions 70 of the side rails 56,60 and corresponding structural connection with the front wall 100 establishes effective load transfer to the lower frame assembly 26. Loads on the front wall 100, therefore, such as those incurred by the weight of the roll-over protection of the cab assembly 674, are transferred directly into the lower frame assembly 26 and plurality of axles 538.

The formation of the open access and service areas 440,450 permits ease of subassembly for components within the upper frame assembly 30, such as, for example, the hydraulic tank 610 and radiator assembly 614. The subassembly ease is achieved because an assembler (not shown) is able to walk freely from an area outside of the upper frame assembly 30 to the crossmember assembly 414 between the side members 350,354 without any structural obstruction therebetween so that connection of the components to the upper frame assembly 30 may be easily accomplished.

The mounting of the upper frame assembly 30 to the lower frame assembly 26 along the entire length of the side members 350,354 and side rails 56,60, respectively, enhances the rigidity of the main frame assembly 34. The mounting of the upper frame assembly 30 to the lower frame assembly 26 is accomplished through only a substantially equidistant horizontal bolting connection therebetween which distributes loading substantially equally along the length of the side members 350,354 and side rails 56,60, strengthening the main frame assembly 34 and virtually eliminating stress risers therein. Additionally, the gradual increase in height of the front end portions 70 of the side rails 56,60 and the corresponding side rail mounting holes 64 thereon ensures that the loading is equally distributed throughout the length of the loader machine 10 even with the increased height (H) of the front end portions 70. Further, the exclusive connection between the upper and lower frame assemblies 30,26 more efficiently contains engine vibration within the lower frame assembly 26 without transfer to the upper frame assembly 30.

The rear compartment 630 of the main frame assembly 34, due to the coupling of the open service area 450 of the upper frame assembly 30 and the rearward compartment 276 of the lower frame assembly 26, provides enhanced access to the engine 560 and radiator assembly 614, as seen in FIG. 14. Further, the rear compartment 630 easily accommodates the pivotal movement of the radiator assembly 614 therein.

The front compartment 624 of the main frame assembly 34 is used as the area for positioning the operator's legs (not shown) within the loader machine 10. The front compartment 624 has a box-like structure defined, in part, by the forward compartment 624. The box-like structure provides a rigid front end portion 18 of the loader machine 10 which virtually eliminates twisting from side loads, such as that incurred from linkage movement and axle impact.

The upper reinforcing plate 122 and angled reinforcing plate 290 at the front and rear end portions 45,52, respectively of the lower frame assembly 26 act as tubular crossmembers for increasing rigidity of the loader machine 10.

The connection of the side members 350,354 with the respective tower assemblies 312,314 provides a solid joint therebetween which further enhances the rigidity of the loader machine 10. Additionally, the crossmember assembly 414 utilizes upper and lower crossmembers 420,424 which act as torque tubes for increasing the rigidity of the loader machine 10.

The side rails 56,60 of the lower frame assembly 26 and respective side walls 370 and inner plates 320 of the upper frame assembly 30 are aligned to form a substantially straight load path for the main frame assembly 34 which efficiently transfers loads directly into the lower frame assembly 26.

The bumper assembly 470 is manufactured with high strength characteristics coupled within the box-like structure to provide an effective stabilizing structure for the front end portion 564 of the engine 560 after mounting of the rear end portion 568 of the engine 560 is completed. The bumper assembly 470 is assembled to the main frame assembly 34 at the end of the assembly sequence so that access to the engine 560 and radiator assembly 614 is not compromised during mounting of the upper frame assembly 30 with the lower frame assembly 26. The connection for the engine stabilizing structure 514 is readily accessible through the bolt access hole 284 on the rear protective plate 270 which improves connection and serviceability thereof. Additionally, the connection between the engine stabilizing structure 514 and the engine 560 through the stabilizer bracket 650 is easily achieved from outside the loader machine 10 at the rear end portion 22 as one of the final steps in the assembly sequence.

An air flow path for the cooling system 604 of the loader machine 10 is established within the structural design. Air from outside the loader machine 10 is drawn in around the air flow area 332 and grill 678 of the cab assembly 674. The air flows around the hydraulic tank 610 adjacent the front compartment 624 and then is pulled into the rear compartment 630 through the open region 460 between the upper and lower crossmembers 420,424 over the engine 560 and radiator assembly 614. The air is then blown out of the rear compartment 630 at a location adjacent the rear hood 672. Utilizing the rigid structure of the loader machine 10 to establish an effective air flow path creates a durable and efficient loader machine 10. Further, the air flow path is positioned at the rear of the cab assembly 647 so that air is drawn in behind the operator (not shown) to reduce noise and interference.

Although the features of the invention are demonstrated in the manufacture and assembly of a skid steer loader machine 10, it should be recognized that the lower frame assembly 26 may be completely manufactured and subassembled for connection with an upper frame assembly 30 for various other types of work machines, such as a lift truck, tow machine, and the like. The ability to manufacture various work machines from a common lower frame assembly 26 decreases manufacturing and assembly costs and increases flexibility.

Other aspects, objects and advantages of this invention can be obtained from a study of the drawings, disclosure and the appended claims.

What is claimed is:

1. A lower frame assembly for use in a skid steer loader machine having a centerline extending along a midsection thereof, the lower frame assembly having front and rear end portions, comprising:

a pair of spaced side rails positioned on opposite sides of the machine centerline;

a front wall positioned at the front end portion of the lower frame assembly and extending between the side rails for connection therewith;

a pair of spaced transmission housings having front and rear end portions, each being connected at the front end portion thereof to the front wall and extending rearwardly therefrom a predetermined distance for connection along a respective side rail; and a fuel tank integrally formed within the lower frame assembly, the fuel tank including a top plate formed in a substantial U-shaped to define an elevated area located at an upper portion of the fuel tank and a depressed area located at a lower portion of the fuel tank areas and a pair of opposed side plates being connected at the rear end portions of each of the pair of transmission housings with the fuel tank extending between the side rails and engine mounts for mounting an engine to the elevated area, for seating a portion of the engine within the depressed area.

2. The lower frame assembly of claim 1, including a horizontally oriented front protective plate adapted for connection between the front wall and the fuel tank to define a bottom wall of the fuel tank, the protective plate being disposed between the pair of transmission housings to define therewith a partially enclosed forward compartment.

3. The lower frame assembly of claim 2, wherein the side rails extend along the entire length of the lower frame assembly, a horizontally oriented rear protective plate is connected to the fuel tank and extends rearwardly therefrom a predetermined distance and is positioned between the side rails for connection therewith to define a rearward compartment which has a different elevation from the forward compartment and an angled reinforcing plate is connected to the bottom plate of the fuel tank for supporting the rear protective plate at the rear end portion of the lower frame assembly.

4. The lower frame assembly of claim 1, including a pair of opposed back flanges positioned at the rear end portion of the lower frame assembly opposite the front wall, each of the back flanges being connected to a respective side rail and extending laterally therefrom a predetermined distance.

5. The lower frame assembly of claim 1, wherein the front wall includes a connecting wall portion attached to the front end portion of each of the pair of transmission housings and a substantially angled supporting wall portion attached to the connecting wall portion and extending upwardly therefrom for connection between the pair of side rails.

6. The lower frame assembly of claim 5, wherein the supporting wall portion is bent at an upper region to define a substantial inverted u-shape region with a planar upper surface, an upper reinforcing plate being connected to the inverted u-shape region of the supporting wall portion.

7. The lower frame assembly of claim 6, wherein a pair of spaced cab mounts are disposed on the upper surface of the supporting wall portion.

8. The lower frame assembly of claim 1 wherein the engine mounts are spaced from a respective one of the pair of side rails.

9. The lower frame assembly of claim 8, wherein the depressed area is disposed between the engine mounts so that the engine extends from the rearward compartment to the forward compartment.

10. The lower frame assembly of claim 2, wherein the forward compartment has a substantial box-like structure.

11. The lower frame assembly of claim 1, wherein the pair of side rails each have a height which is greater at the front end portion of the machine as opposed to the rear end portion of the machine.

12. The lower frame assembly of claim 1, wherein the pair of side rails each have front and rear end portions defined respectively with the front and rear end portions of the machine and an intermediate portion disposed between the front and rear portions thereof, the front end portions of the side rails have a height which is greater than the rear end and intermediate portions thereof with a gradual increase in height occurring at an outwardly diverging section of the intermediate portion.

13. The lower frame assembly of claim 1, wherein a portion of the pair of side rails define outer walls of the transmission housings and the fuel tank.

14. The lower frame assembly of claim 2, wherein the pair of side rails are formed with an angular portion which extends under the transmission housings to define a bottom wall thereof and extends under the fuel tank to partially define the bottom plate.

15. The lower frame assembly of claim 14, wherein the front protective plate extends under the fuel tank to define with the pair of side rails the bottom plate.

16. The lower frame assembly of claim 14, wherein the front protective plate is seated on and connected to the pair of side rails extending under the transmission housings and fuel tank to further define the forward compartment.

* * * * *